United States Patent [19]
Tanaka et al.

[11] 3,870,760
[45] Mar. 11, 1975

[54] PREPARATION OF OXIDATION PRODUCTS OF CYCLOALKANES

[75] Inventors: Kyugo Tanaka, Yokohama; Shozo Oshima, Tokyo; Itaru Watanabe, Yokohama, all of Japan

[73] Assignee: Asahi Kasei Kogyo Kabushiki Kaisha, Osaka, Japan

[22] Filed: Mar. 29, 1972

[21] Appl. No.: 239,390

[30] Foreign Application Priority Data
Mar. 31, 1971 Japan.............................. 46-18783
Aug. 2, 1971 Japan.............................. 46-57498
Nov. 1, 1971 Japan.............................. 46-86278

[52] U.S. Cl....... 260/586 P, 260/610 A, 260/610 B, 260/617 H, 260/631 R
[58] Field of Search .......... C07c/45/00; 260/586 B, 260/610 B, 617 H, 631 R

[56] References Cited
UNITED STATES PATENTS
2,475,605  7/1949  Prutton et al...................... 260/610
2,898,377  8/1959  Handy et al. ...................... 260/610

Primary Examiner—Leon Zitver
Assistant Examiner—A. Siegel
Attorney, Agent, or Firm—Burgess & Sprung, Dinklage

[57] ABSTRACT

Liquid phase oxidation of a cycloalkane having 5 to 12 carbon atoms with molecular oxygen in the presence of an aliphatic or aromatic nitrile having 2 to 8 carbon atoms, preferably using a reactor whose metallic inner wall is wholly coated with a phosphate or pyrophosphate which is sparingly soluble in water.

11 Claims, No Drawings

PREPARATION OF OXIDATION PRODUCTS OF CYCLOALKANES

This invention relates to a process for the liquid phase oxidation of a cycloalkane with molecular oxygen to produce the corresponding cycloalkylhydroperoxide, cycloalkanol and cycloalkanone. More particularly it relates to a process for the liquid phase oxidation of a cycloalkane with molecular oxygen in the presence of a nitrile compound under milder reaction conditions to produce the corresponding cycloalkylhydroperoxide, cycloalkanol and cycloalkanone with high efficiency and yields.

Methods are already available for the liquid phase oxidation of a cycloalkane with molecular oxygen to produce the corresponding cycloalkylhydroperoxide, cycloalkanol and cycloalkanone. For example, such methods include (1) the liquid phase oxidation of a cycloalkane using a cobalt type catalyst, (2) the liquid phase oxidation of a cycloalkane in the presence of boric acid to form a cycloalkanol as the ester of boric acid and (3) a method of preparing the cycloalkanol and cycloalkanone with good yields by oxidizing a cycloalkane in the liquid phase in the absence of any catalyst to produce the corresponding cycloalkylhydroperoxide, cycloalkanol and cycloalkanone and thermally or catalytically decomposing the resulting reaction mixture.

According to the conventional auto-oxidation reaction of a cycloalkane as in the above-described methods (1) and (2) the desired products are the corresponding cycloalkanone and cycloalkanol. On the other hand, as the auto-oxidation reaction is a typical consecutive reaction, the formed cycloalkylhydroperoxide is readily decomposed to the cycloalkanol and cycloalkanone and further to various mono- and dicarboxylic acids and certain kinds of polymers in the more advanced oxidation. Consequently it is difficult to produce only the corresponding cycloalkanone and cycloalkanol with high selectivity at high conversion by the auto-oxidation of a cycloalkane. In order to improve the selectivity of the cycloalkanol and cycloalkanone as in the above-described method (3) it is preferred that at the first step the selectivity to the cycloalkylhydroperoxide is increased and at the second step the cycloalkylhydroperoxide is decomposed to the cycloalkanol and cycloalkanone with high selectivity. Even by this method in order to obtain the cycloalkylhydroperoxide with high selectivity it is necessary that the oxidation reaction is stopped at a very low conversion of a cycloalkane and at the next step the cycloalkylhydroperoxide is decomposed to the corresponding cycloalkanol and cycloalkanone with high conversion. Therefore, still the cost of installation and utility for recovering the cycloalkanol and cycloalkanone from the reaction solution becomes disadvantageously very high.

The liquid phase oxidation of a cycloalkane is a typical consecutive oxidation reaction and it is necessary that the conversion of a cycloalkane as the starting material is controlled to be a low value of 2 to 20 percent in order to obtain a high selectivity to the cycloalkane oxides such as cycloalkylhydroperoxide, cycloalkanone and cycloalkanol. According to U.S. Pat. No. 3,119,873 the conversion of cyclohexane is about 6 percent and the total selectivity to cyclohexanol and cyclohexanone is at most 70 percent as the result of oxidizing cyclohexane with oxygen at 158°C. in the presence of about 40 p.p.m. of cobalt naphthenate. Thus, the products of oxidation reaction contain a large amount of the unreacted cycloalkane and therefore a highly efficient means for separating the unreacted cycloalkane from the products of oxidation reaction is required. A distillation method is generally employed for such a separating means but due to a large amount of the unreacted cycloalkane the cost of installation and utility is very high.

It has now been discovered that in the liquid phase oxidation of a cycloalkane the presence of a nitrile compound promotes the oxidation reaction to produce the corresponding cycloalkylhydroperoxide, cycloalkanol and cycloalkanone with high selectivity at high conversion. Moreover, after the oxidation reaction the cycloalkylhydroperoxide, cycloalkanol and cycloalkanone can be easily and readily recovered as a concentrated nitrile compound solution which is separated from a large amount of the unreacted cycloalkane. The nitrile compounds of this invention are not mere diluents but are special solvents having an effect of promoting the oxidation reaction and of stabilizing the cycloalkylhydroperoxides.

The cycloalkanes which may be used in the present invention are cycloaliphatic hydrocarbons having 5 to 12 carbon atoms and include, for example, cyclopentane, cyclohexane, methylcyclohexane, cyclooctane, cyclododecane and decalin.

The nitrile compounds which may be used in the present invention are aliphatic or aromatic hydrocarbon nitriles having 2 to 8 carbons and include, for example, acetonitrile, propionitrile, butyronitriles, glutaronitrile, adiponitrile, benzonitrile and tolunitriles.

It is preferred that a weight ratio of the cycloalkane to the nitrile compound is from 20:1 to 1:3 and more preferably from 10:1 to 1:1. At weight ratios outside this range the reaction proceeds but there are noticeable decreases in yield of the cycloalkylhydroperoxides and in space yield of a reactor.

A further feature of this invention is the discovery that when a nitrile compound which is a better solvent for the cycloalkane oxides than the cycloalkane and is poorly miscible with the cycloalkane is used as the nitrile compound the reaction mixture is separated into two phases by cooling the reaction mixture at a temperature where the vapor pressures of the unreacted cycloalkane and the nitrile compound are sufficiently low and the reaction mixture does not coagulate, that is, at a temperature of from about 0° to 70°C. Namely, one phase is a nitrile phase containing the cycloalkane oxides and the other is an unreacted cycloalkane phase substantially not containing the cycloalkane oxides. Thus, it is possible to obtain the cycloalkane oxides as a highly concentrated nitrile solution. In this case, it is not clear whether the reaction solution is homogeneous in the reaction system. In the combination of cyclohexane and acetonitrile the critical solubility temperature is 76°C. and the reaction solution is definitely homogeneous under the reaction conditions of the present process. Even if the reaction solution is heterogeneous it is obvious that the nitrile is partially dissolved in the cycloalkane phase and the cycloalkane in the nitrile phase because of mutual solubility according to the degree of the oxidation reaction and the effect of the nitrile compound may be fully exhibited. Accordingly, when such a nitrile compound which is a better solvent for the cycloalkane oxides than the cycloalkane and is poorly miscible with the cycloalkane is employed, it does not influence the substantial effect of the nitrile compound of this process whether the cycloaklane and the nitrile compound are homogeneous or heterogeneous in the reaction system.

After the phases are separated and the phase of the unreacted cycloalkane is, if necessary, washed with water or an aqueous weak alkaline solution, it is recycled to the reactor for the oxidation reaction. On the other hand, regarding the phase of the nitrile compound containing the major part of the cycloalkane oxides, the cycloalkylhydroperoxide is selectively converted into the cycloalkanol and cycloalkanone with a metal salt or a metal oxide as a catalyst or by hydrogenation and the nitrile compound and a small amount of the unreacted cycloalkane are removed by distillation to recover crude cycloalkanol and cycloalkanone. When the boiling point of the nitrile compound is higher than that of the cycloalkane and unreacted cycloalkane the reaction products are directly obtained as the distillates on distillation.

Examples of suitable nitrile compounds which are better solvents for the cycloalkane oxides than the cycloalkanes and are poorly miscible with the cycloalkanes include lower aliphatic nitriles such as acetonitrile, propionitrile and butyronitriles.

A still further feature of the invention is the discovery that by coating the inner wall of a reactor and the surfaces of all attached equipments which contact the reaction solution with a phosphate or a pyrophosphate which is sparingly soluble in water the effect of the nitrile compound becomes eminent and the cycloalkylhydroperoxide, cycloalkanol and cycloalkanone can be obtained with high selectivity at high conversion.

The materials of a reactor may be any metals which are usually employed for reactors. Such materials include, for example, stainless steel such as SUS–26, 27, 28, 31, 32 and 33, titanium metal and nickel alloys such as Monel metal, Hastelloy and Inconel.

Suitable types of reactors include, for example, upright towers, packed columns and tubular converters.

Exemplary phosphates and pyrophosphates which are sparingly soluble in water include sodium phosphate, disodium hydrogenphosphate, potassium dihydrogenphosphate, calcium dihydrogenphosphate, sodium pyrophosphate, potassiun pyrophosphate and disodium dihydrogenpyrophosphate.

Any method for coating a reactor with a phosphate or a pyrophosphate may be employed. For example, an empty reactor is throughly washed until the inner wall is completely dampened and heated at a temperature of from 90° to 250°C. Separately, an about 15 weight percent aqueous solution of, for example, sodium pyrophosphate ($10.H_2O$) is warmed. This solution is poured along the wall of the reactor in the form of liquid and rapidly heated to dryness while the excess solution flowing to the bottom is discarded or the warmed aqueous solution is sprayed over the wall of the reactor and heated to dryness. Also the reactants and an aqueous solution of the phosphate or the pyrophosphate may be charged to a reactor and water is driven off by azeotropic distillation to coat the wall only with the phosphate or the pyrophosphate. It is important that fine crystals of the phosphate or the pyrophosphate are uniformly and firmly adhered to the metal surface of a reactor and the metal surface is not exposed.

The peeling off of a coating during the oxidation reaction can be avoided by spraying a finely atomized aqueous solution of the phosphate or the pyrophosphate on the wall of a reactor which is sufficiently heated at about 120°C., instantly evaporating water to form a uniform and dense coating and removing water from the reaction system to the utmost during the oxidation reaction. Unless the reaction system contains a large amount of water, there is no peeling off of the coating and the effect of coating is retained for a long period. Even when a large amount of water is formed during the oxidation reaction the water can be continuously removed as the azeotrope with a cycloalkane.

The oxidation reaction temperature is preferably in the range of from about 100° to 200°C., with the more preferred range being from 120° to 160°C. It is described in Journal of the Chemical Society of Japan, Industrial Section, 74, 382(1971) that generally the oxidation reaction of a cycloalkane does not proceed smoothly in the absence of any catalyst and solvent unless the reaction temperature is above 150°C. According to the process of this invention, however, the oxidation reaction proceeds sufficiently at about 120°C. Thus, it may well be said that the addition of a nitrile compound clearly promotes the oxidation reaction. At temperatures lower than about 100°C. the rate of reaction decreases and as the temperature increases above 200°C. there is a noticeable decrease in yield of the cycloalkane oxides.

The reaction pressure is sufficient to maintain a liquid phase and is preferably in the range of from atmospheric pressure to about 50 Kg./$cm^2$. in gauge.

The molecular oxygen which may be employed is pure oxygen or a molecular oxygen containing gas which is diluted with nitrogen gas or carbon dioxide gas such as air. In carrying out the reaction it is necessary that a sufficient amount of molecular oxygen is introduced and dispersed into the reaction system by stirring under pressure or by blowing.

In order to remove or remarkably shorten the induction period of reaction it is preferred to add a very small amount of an initiator or a part of the reaction solution to the feeding reaction solution. Examples of suitable initiators include benzoyl peroxide, azobisisobutyronitrile, di-tert-butyl peroxide, cumene hydroperoxide and cyclohexanone. The amount is preferably about 10 to 1,000 p.p.m. based on the reaction solution.

The process may be carried out in a continuous or batchwise manner.

It is described in Japanese Patent Publication No. 22960/1964 that an aqueous solution of glutaric acid, adipic acid, formic acid or acetic acid is employed as an agent for selectively extracting the cycloalkyl oxides from an oxidation reaction mixture of a cycloalkane. But the extracting efficiency of these agents is low and a large amount of the agents is necessary for increasing the extract. Accordingly a large scale distilling process is unfavorably required for separating the extract. Thus the advantage of using these extracting agents completely counter-balance these disadvantages. Also a method of using a mixed extracting agent or a method of extraction by two steps is known but the separation and purification of the extracted cycloalkane oxides are very complicated and these methods are commercially unfavorable. Moreover, the extracting agents are generally expensive.

The afore-mentioned lower aliphatic nitrile compounds of this invention may also be used as an extracting agent which avoids the difficulties of prior art extracting agents. The extraction is generally carried out at a temperature of from about 0° to 70°C. under a pressure of from atmospheric pressure to about 10 Kg./cm²., preferably at a temperature of from about 10° to 40°C. at about atmospheric pressure. The weight ratio of the reaction mixture solution to the nitrile compound is from 20:1 to 1:3, preferably from 10:1 to 1:1. Known counter-current multi-stage extracting methods as well as one-stage extracting methods may be employed in the present process.

This invention will now be illustrated by the following examples.

EXAMPLE 1

A 300 cc., SUS–32 autoclave of inductively rotating type equipped with a gas inlet, a reflux condenser and a separator was heated at a temperature between 120° and 150°C. and the whole surface which might come into contact with a reaction solution was dampened with a 15 weight percent aqueous solution of a phosphate or a pyrophosphate and dried again at a temperature between 120° and 150°C. The procedure was repeated two more time to coat the inner wall of the reactor with the phosphate or the pyrophosphate. Into the reactor thus treated there were charged 0.016 g. of benzoylperoxide, a cycloalkane and a nitrile compound set forth in Table 1. Then air was continuously blown therein at a rate of 32 Nl/hour under a pressure of 25 Kg./cm². gauge while inductively stirring the reaction solution at a rate of 880 r.p.m. The reaction solution was cooled to room temperature and the products and the unreacted cycloalkane were analyzed with gas liquid chromatography and iodometry. The reaction conditions and results are shown in Table 1. In Run Nos. 1 and 2 the reactor was not coated with a phosphate or a pyrophosphate. It may be understood from the results that in the liquid phase oxidation of a cycloalkane having 5 to 12 carbon atoms in the presence of a nitrile compound the selectivity to the cycloalkylhydroperoxide, cycloalkanol and cycloalkanone is increased even at a high conversion of the cycloalkane and the reaction temperature need not be high.

Table 1

| Run No. | Cycloalkane (g.) | Nitrile (g.) | Compound for coating reactor | Reaction temperature (°C.) | Reaction time (hour) | Conversion of cycloalkane (%) | Selectivity to cycloalkylhydroperoxide (%) | Selectivity to cycloalkane oxides (%) | Concentration of cycloalkane oxides (weight %) |
|---|---|---|---|---|---|---|---|---|---|
| 1 | Cyclohexane 160 | — | — | 155 | 2.75 | 7.7 | 23.2 | 64.1 | 6.1 |
| 2 | Cyclohexane 145 | Acetonitrile 15 | — | 150 | 3.0 | 6.5 | 67.0 | 76.6 | 5.8 |
| 3 | Cyclohexane 160 | — | $Na_4P_2O_7 \cdot 10H_2O$ | 150 | 2.5 | 7.8 | 49.6 | 79.9 | 8.1 |
| 4 | Cyclohexane 145 | Acetonitrile 15 | $Na_4P_2O_7 \cdot 10H_2O$ | 150 | 3.0 | 7.9 | 74.8 | 94.5 | 8.6 |
| 5 | Cyclohexane 120 | Propionitrile 40 | $Na_2H_2P_2O_7 \cdot 6H_2O$ | 125 | 6.0 | 12.3 | 68.5 | 86.4 | 10.3 |
| 6 | Cyclohexane 80 | Propionitrile 80 | $Na_2H_2P_2O_7 \cdot 6H_2O$ | 160 | 3.5 | 16.8 | 46.3 | 61.8 | 6.7 |
| 7 | Cyclopentane 150 | Acetonitrile 10 | $Na_3PO_4 \cdot 12H_2O$ | 120 | 5.0 | 10.5 | 82.4 | 92.9 | 12.4 |
| 8 | Cyclopentane 120 | p-Tolunitrile 40 | $Na_2H_2P_2O_7 \cdot 6H_2O$ | 125 | 4.25 | 11.3 | 70.0 | 85.3 | 9.9 |
| 9 | Cyclooctane 140 | n-Butyronitrile 20 | $Na_2HPO_4 \cdot 12H_2O$ | 140 | 3.0 | 12.3 | 71.1 | 86.0 | 11.3 |
| 10 | Cyclooctane 133 | Glutaronitrile 27 | $K_4P_2O_7 \cdot 3H_2O$ | 145 | 4.5 | 17.3 | 51.1 | 68.5 | 12.1 |
| 11 | Decalin 60 | Adiponitrile 100 | $KH_2PO_4$ | 130 | 2.7 | 13.6 | 78.6 | 88.7 | 5.4 |
| 12 | Cyclodecane 160 | Benzonitrile 120 | $K_4P_2O_7 \cdot 3H_2O$ | 130 | 2.5 | 32.1 | 73.4 | 88.1 | 8.1 |
| 13 | Cyclododecane 160 | — | $Ca(H_2PO_4)_2 \cdot H_2O$ | 130 | 3.0 | 6.3 | 64.6 | 80.1 | 5.6 |

Note:

$$\text{Conversion of cycloalkane (\%)} = \frac{\text{Reacted cycloalkane (mole)}}{\text{Fed cycloalkane (mole)}} \times 100$$

$$\text{Selectivity to cyclohydroperoxide (\%)} = \frac{\text{Produced cyclohydroperoxide (mole)}}{\text{Reacted cycloalkane (mole)}} \times 100$$

$$\text{Selectivity to cycloalkane oxides (\%)} = \frac{\text{Produced cyclohydroperoxide (mole)} + \text{Produced cycloalkanol (mole)} + \text{Produced cycloalkanone (mole)}}{\text{Reacted cycloalkane (mole)}} \times 100$$

$$\text{Concentration of cycloalkane oxides (weight \%)} = \frac{\text{Produced cyclohydroperoxide (g.)} + \text{Produced cycloalkanol (g.)} + \text{Produced cycloalkanone (g.)}}{\text{Reaction mixture solution (g.)*}} \times 100$$

* Regarding reaction mixture solutions which can easily be separated into two phases, the total weight of the two phases is the denominator. Such products are made homogeneous by adding a suitable homogenizing agent thereto and subjected to analysis.

EXAMPLE 2

Into a 300 cc., SUS–32 autoclave of inductively rotating type equipped with a gas inlet, a reflux condenser and a separator for water there were charged 100 ml. of cyclohexane and 1.0 g. of sodium pyrophosphate dissolved in 8 ml. of water. Then at atmospheric pressure firstly water was distilled off by azeotropic distillation and secondly all cyclohexane was distilled off and the reactor was heated to dryness. Thus the inner wall of the reactor was coated with sodium pyrophosphate. Into the reactor there were charged 0.016 g. of azobisisobutyronitrile, a cycloalkane and a nitrile compound set forth in Table 2. Then air was continuously blown therein at a rate of 32 Nl/hour under a pressure of 25 Kg./cm². gauge at a specified reaction for a specified time while inductively stirring the reaction solution at a rate of 800 r.p.m. The reaction mixture solution was cooled at a specified temperature and the products and the unreacted cycloalkane were analyzed by gas liquid chromatography and iodometry. The reaction conditions and results are shown in Table 2.

It is shown by this example that after the oxidation reaction of a cycloalkane in the presence of acetonitrile or propionitrile which is poorly miscible with the cycloalkane at a temperature of from 0° to 70°C., the reaction mixture solution may be cooled and separated into two phases, i.e., one phase being the unreacted cycloalkane substantially free of the cycloalkane oxides, the other being the nitrile compound phase substantially free of the unreacted cycloalkane, to recover the greatly concentrated cycloalkane oxides. The kind and amount of the nitrile compound will depend upon the object of adding the nitrile compound and it is preferred that the separation temperature is low.

The effect shown by this example is clear by comparing the column of "Concentration of cycloalkane oxides" in Table 1 with the column of "Total concentration of cycloalkane oxides in nitrile phase." As a result without extracting the cycloalkane oxides from the separated phase of the unreacted cycloalkane 70 to 80% of the total cycloalkane oxides are recovered in 2 to 3 times their usual concentration.

Table 2

| Run No. | Cyclo-alkane (g.) | Nitrile (g.) | Reaction conditions — Reaction temperature (°C.) | Reaction conditions — Reaction time (hour) | Total weight of reaction mixture (g.)*1 | Temperature of phase separation (°C.) | Weight of nitrile phase (g.) | Solved rate in nitrile compound phase *2 — Cycloalkyl-hydroperoxide (%) | Solved rate in nitrile compound phase *2 — Cycloalkanol (%) | Solved rate in nitrile compound phase *2 — Cycloalkanone (%) | Solved rate in nitrile compound phase *2 — Unreacted cycloalkane (%) | Total concentration of cycloalkane oxides in nitrile phase (weight %) *3 |
|---|---|---|---|---|---|---|---|---|---|---|---|---|
| 1 | Cyclohexane 140 | Acetonitrile 20 | 150 | 3 | 163.8 | 30 | 28.2 | 72.4 | 56.0 | 47.5 | 2.3 | 38.4 |
| 2 | Cyclohexane 120 | Acetonitrile 40 | 130 | 5.7 | 163.3 | 30 | 56.3 | 86.3 | 78.7 | 70.0 | 6.0 | 26.4 |
| 3 | Cyclohexane 120 | Acetonitrile 40 | 130 | 5.2 | 163.6 | 10 | 58.2 | 92.8 | 87.1 | 75.6 | 5.1 | 28.3 |
| 4 | Cyclohexane 120 | Acetonitrile 80 | 160 | 3.5 | 166.8 | 10 | 100.0 | 98.8 | 95.3 | 86.6 | 16.2 | 10.7 |
| 5 | Cyclooctane 140 | Acetonitrile 20 | 140 | 3 | 165.8 | 25 | 33.1 | 80.2 | 67.0 | 59.9 | 0.6 | 43.6 |
| 6 | Decalin 100 | Propionitrile 60 | 150 | 3.2 | 163.7 | 25 | 80.2 | 83.3 | 77.0 | 70.6 | 16.0 | 14.3 |
| 7 | Cyclododecane 60 | n-Butyronitrile 100 | 135 | 2 | 162.3 | 50 | 86.1 | 85.7 | 80.5 | 77.1 | 13.3 | 11.0 |

Note:
*1 Total weight of two phases before phase separation.

*2 $\dfrac{\text{Weight of each product in nitrile compound phase (g.)}}{\text{Weight of total product (g.)}} \times 100$

*3 $\dfrac{\text{Cycloalkylhydroperoxide (g.) + Cycloalkanol (g.) + Cycloalkanone (g.)}}{\text{Total Weight of nitrile compound (g.)}} \times 100$

EXAMPLE 3

Each of the reaction mixture solutions was obtained by a known method with a known catalyst and did not contain a cycloalkylhydroperoxide. In Run Nos. 1 and 2 the extraction was effected twice while in Run No. 3 the extraction was effected by dividing 4 times.

Table 3

| Run No. | 1 | 2 | 3 |
|---|---|---|---|
| Reaction conditions | | | |
| Catalyst | Cobalt naphthenate | Cobalt octanoate | Orthoboric acid |
| Reaction temperature (°C) | 160 | 153 | 165 |
| Reaction mixture solution | | | |
| Composition | | | |
| Unreacted cycloalkane | Cyclohexane | Cyclohexane | Cyclododecane |
| (g.) | 91.9 | 95.0 | 75.3 |
| Cycloalkanol (g.) | 2.97 | 2.67 | 2.27 |
| Cycloalkanone (g.) | 4.02 | 2.33 | 20.70 |
| Weight of reaction mixture solution (g.) | 101.8 | 102.0 | 103.3 |
| Extracting conditions | | | |
| Nitrile compound (g.) | Acetonitrile | Acetonitrile | Propionitrile |
| | 50 | 25 | 65 *4 |
| Extracting temperature (°C.) | 10 | 35 | 50 |
| Results | | | |
| Weight of extract of nitrile phase (g.) | 59.2 | 28.0 | 67.1 |
| Extraction rate (%)*1 | | | |
| Cycloalkanol | 93.5 | 78.1 | 84.3 |
| Cycloalkanone | 90.7 | 69.0 | 79.6 |
| Concentration *2 | 10.9 | 13.2 | 27.4 |
| Reference | | | |
| Concentration of reaction mixture solution before extraction (%) *3 | 6.86 | 4.90 | 22.2 |

Note:

*1 Extraction rate (%) = $\dfrac{\text{Weight of cycloalkanol or cycloalkanol extracted in nitrile phase (g.)}}{\text{Weight of cycloakanol or cycloalkanone in reaction mixture solution}} \times 100$

*2 Weight concentration of cycloakanol and cycloalkanone
*3 Weight concentration of cycloalkanol and cycloakanone
*4 Separated under a pressure of 2 Kg./cm².

It is clear from the results that acetonitrile and propionitrile have a very high extraction rate as an extracting agent and are superior to the known extracting agents in simplicity and low cost of the extracting process.

What is claimed is:

1. A process for producing a mixture of the corresponding cycloalkylhydroperoxide, cycloalkanol and cycloalkanone which comprises oxidizing a cycloalkane having 5 to 12 carbon atoms with molecular oxygen in the liquid phase in the presence of an aliphatic or aromatic hydrocarbon nitrile compound having 2 to 8 carbon atoms at a temperature of from about 100° to 200°C. under a pressure of from atmospheric pressure to about 50 Kg./cm² gauge at a weight ratio of said cycloalkane to said aliphatic or aromatic nitrile compound of from 20:1 to 1:3.

2. A process as claimed in claim 1, wherein said nitrile compound is selected from the group consisting of acetonitrile, propionitrile, butyronitriles, glutaronitrile, adiponitrile, benzonitrile and tolunitriles.

3. A process as claimed in claim 1, wherein said cycloalkane having 5 to 12 carbon atoms is selected from the group consisting of cyclopentane, cyclohexane, methylcyclohexane, cyclooctane, cyclododecane and decalin.

4. A process as claimed in claim 1, wherein there is used a reactor whose metallic inner wall is wholly coated with a sparingly water-soluble phosphate or pyrophosphate.

5. A process as claimed in claim 4, wherein said phosphate or pyrophosphate is selected from the group consisting of sodium phosphate, disodium hydrogenphosphate, potassium dihydrogenphosphate, calcium dihydrogenphosphate, sodium pyrophosphate, potassium pyrophosphate and disodium dihydrogenpyrophosphate.

6. A process as claimed in claim 5, wherein the reaction temperature is from about 120° to 160°C.

7. A process as claimed in claim 6, wherein a weight ratio of said cycloalkane to the aliphatic or aromatic nitrile compound is from 10:1 to 1:1.

8. A process for producing a mixture of the corresponding cycloalkylhydroperoxide, cycloalkanol and cycloalkane which comprises oxidizing a cycloalkane having 5 to 12 carbon atoms with molecular oxygen in the liquid phase at a temperature of from 100° to 200°C. under a pressure of from atmospheric pressure to about 50 Kg./cm². gauge in the presence of a lower aliphatic nitrile compound which is a better solvent for the cycloalkylhydroperoxide, cycloalkanol and cycloalkanone than the cycloalkane and is poorly miscible with the cycloalkane at a temperature of from about 0° to 70°C., at a weight ratio of the cycloalkane to the nitrile compound of from 20:1 to 1:3, cooling the resulting reaction mixture solution to a temperature of from about 0° to 70°C. under a pressure of from atmospheric pressure to about 10 Kg./cm.² to separate the reaction mixture solution into two phases, one being the phase of the unreacted cycloalkane and the other being that of the nitrile compound and recovering the phase of the nitrile compound.

9. A process as claimed in claim 8, wherein said nitrile compound is selected from the group consisting of acetonitrile, propionitrile and butyronitriles.

10. A process as claimed in claim 8, wherein a reactor is used whose metallic inner wall is wholly coated with a phosphate or a pyrophosphate selected from the group consisting of sodium phosphate, disodium hydrogenphosphate, potassium dihydrogenphosphate, calcium dihydrogenphosphate, sodium pyrophosphate, potassium pyrophosphate and disodium dihydrogenpyrophosphate.

11. A process as claimed in claim 10, wherein the separation of the reaction mixture solution into the phase of the unreacted cycloalkane and that of the nitrile compound is effected at a temperature of from about 10° to 40°C. at about atmospheric pressure.

* * * * *